United States Patent Office 2,804,247
Patented Aug. 27, 1957

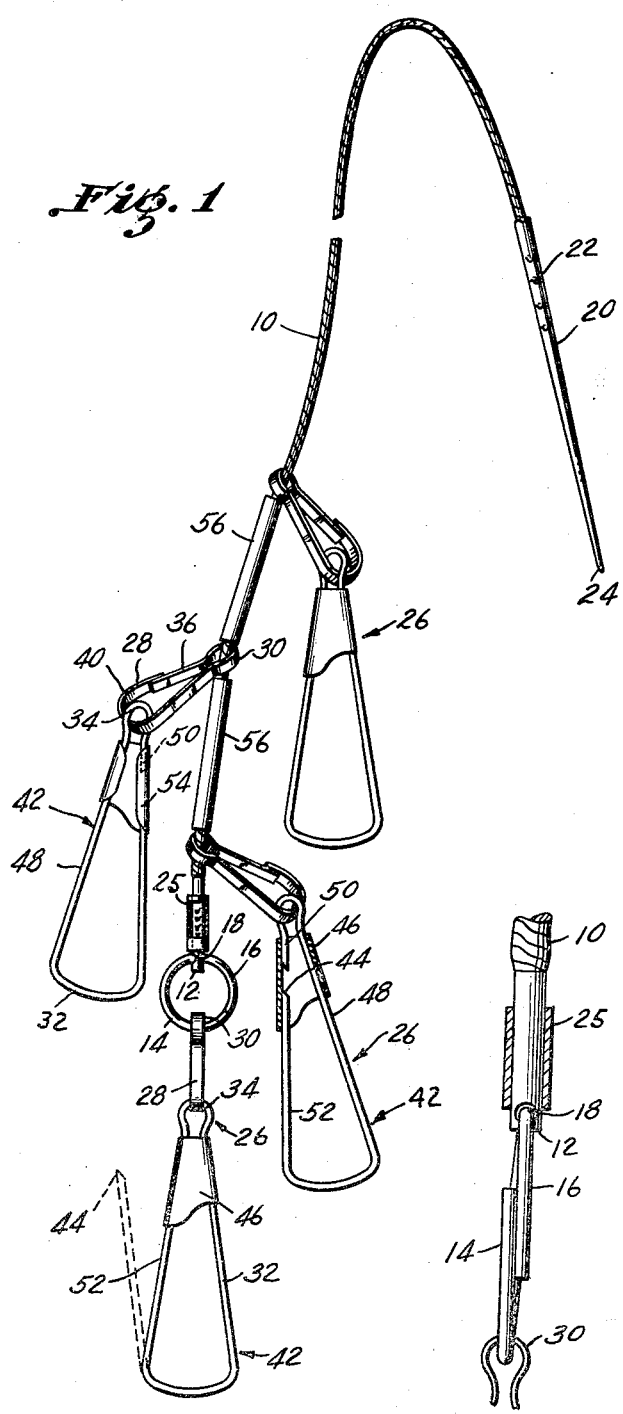
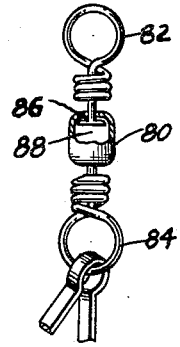
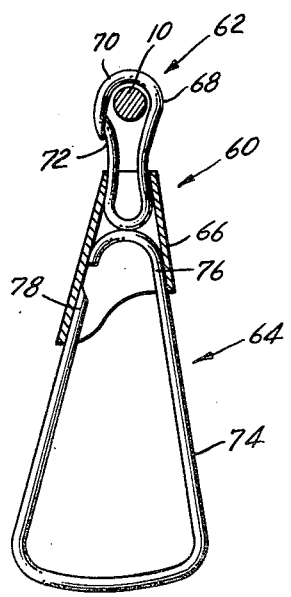
INVENTOR.
WILLIAM M. GALLAGHER

2,804,247

FISH STRINGER

William M. Gallagher, Oklahoma City, Okla.

Application October 9, 1953, Serial No. 385,181

3 Claims. (Cl. 224—7)

This invention relates to fishing equipment, and in particular to a fish stringer used for retaining fish in water after they have been caught.

A fish stringer as commonly constructed, comprises a line adapted to be fastened at one end to a boat, wharf, rock, tree, or adapted to have one end plunger into the ground. The stringer is provided with hoops or similar devices which can be inserted through the mouth of a fish. The fish is thus retained on the line. The disadvantage with prior stringers is often that the hook-like elements are fixedly attached to the line. This makes it necessary to remove the stringer from the water as each fish is placed thereon. As a result the fish thereon are raised from the water, the fisherman is apt to be injured by barbs or fins, and also the process of attaching to the line is rendered difficult by the motions of the fish. Furthermore, the stringer can become quite heavy and thus even more difficult to handle as more fish are caught.

Efforts have been made to overcome some of these difficulties with more or less partial success. Some stringers have been devised with hooks attached to sleeves which can be slipped onto the line with a fish attached. This eliminates the necessity for raising the stringer out of the water or hauling it in. However, with such an arrangement it is necessary to untie the anchored end or remove it from the ground, hold the entire weight of the stringer in one hand, and then thread the sleeve with hook and struggling fish attached on the line of the stringer.

An object of this invention is to provide a fish stringer with which fish can be placed on stringer hooks and the hooks then placed on the line without disengagement of the line from a boat, etc. or from the ground. As a result the procedure of stringing is greatly simplified. There is less chances of injury to the fish or fisherman, no danger of losing the string, and the stringing operation is greatly simplified.

Another object of this invention is to provide a fish stringer of simplified construction, of low cost and simple to use.

A further object of the invention is to provide a stringer with which proper spacing of the fish is possible.

These and other objects and advantages will become apparent from the following description and accompanying drawings, in which:

Figure 1 is an elevational view of a stringer constructed in accordance with the invention, showing hooks in place on the line.

Figure 2 is a side elevational view of a portion of the stringer of Fig. 1.

Figure 3 is an elevational view of another form of hook constructed in accordance with the invention.

Figure 4 is an elevational view of a swivel which may be used with my invention.

Identical reference characters in the several views indicate identical elements.

Referring now particularly to the drawings, the fish stringer comprises a cord 10 which can be formed of wire or any other suitable material. At one end a cylindrical clamp 12 is pressed onto the cord and crimped so as to prevent disengagement. A stop comprising a loop or ring 14 having overlapping ends such as 16, is received within spaced openings 18 provided in clamp member 12. At its opposite end the cord 10 is provided with a pointed spear-like needle 20. The needle is pressed onto the cord similar to member 12, and crimps 22 are used to make the attachment more secure. The spearlike member 20 can be plunged into the ground since it has a pointed end 24, or can be used to guide the end of the cord through a hanger or other suitable device for securing the stringer.

A spacer comprising a cylindrical hollow member 25 is shown resting against the ring. Fish holding attachment 26 is shown connected to ring 14. The fish holding attachment comprises a spring fastener 28 having a bight 30 slidingly receiving ring 14, and a spring snap fastener 32 having a bight 34 removably received on the fastener 28. It is seen that the snap hook fastener 32 can be removed from fastener 28 by depressing tongue 36 and sliding bight 34 off the curved portion 40. Snap hook fastener 32 comprises a wire-like element 42 having a pointed end 44 normally positioned within guard 46.

Guard 46 is securely attached to leg 48 by suitable bending thereof, and also to the end 50 of wire 42. However, the opposite leg 52 can be freely moved within flange 54. The construction and operation of the snap fastener element should be obvious.

In Figure 1 I show a series of fish holding attachments slidingly positioned on the cord 10 and spaced apart by spacer elements 56. Any number of such spacers and fish holding attachments may be used and the spacers may be of varying sizes.

By visualizing the free end of the stringer having the lower fish holding attachment in the water with a fish attached, and the upper end of the stringer securely fixed to the ground, or to a boat, etc. the desirable features of my invention become apparent. The outer or lower snap hook fasteners can be left detached from the upper or inner snap hook fasteners until another fish is caught. With the spacers and smaller snap hook fasteners 28 on the cord and in the boat, or on shore, the recently caught fish can be attached to a lower snap fastener element. The lower snap hook fastener element can then be engaged with the upper snap hook fastener element and the fish holding attachment thus formed, together with a spacer, if desired, can be slipped downwardly on the cord, allowing the fish to proceed into the water. This is done without reeling in the fish stringer and without untying the fixed end. It is not necessary to hold the weight of the fish already attached to the stringer.

In Figure 3 I show a modified form of fish-holding attachment. Similarly to attachment 26 the fish-holding attachment 60 comprises an upper snap hook fastener 62 and a lower snap hook fastener 64. A guard 66 serves as a means of interconnecting the two snap fasteners. The upper snap hook fastener comprises a spring-like wire 68 having a looped lower end clampingly received within sleeve 66, and an upper bight portion 70 formed by one end thereof. The movable tongue 72 is formed by the opposite end of the wire 68.

The bight 70 receives cord 10 and it is seen that the fish holding attachment can be disengaged from the cord by depressing tongue 72. The lower snap hook fastener 64 comprises a piece of wire 74 having one end 76 clampingly received in guard 66, and its opposite pointed end 78 slidingly received therein. It is seen that end 78 can be moved out of the guard for attachment to a fish.

With the fish holding attachment 60, a fish can be secured on the lower snap hook fastener and the upper snap hook fastener can then be engaged on the cord 10 without detaching the cord from the boat or ground. The spacers of course are left on the cord.

In Figure 4 I show a swivel which can be used with my stringer. The swivel comprises a body 80, looped projecting elements 82 and 84, each of which has a headed end 86 within the hollow chamber 88 and is of a common type used in fishing. The looped element 82 similar to bights 30 and 70 is of a size such that it will not ride over spacers 56. The opposite element is large enough to receive either bight. In use the swivels and spacers are left on the line and the snap fasteners are attached to the swivels instead of directly to the cord. Some fishermen will prefer to use swivels.

When the stringer is intended to be used with a boat or pier the pointed needle 20 can be deleted. Obviously any suitable end can be used. For example, a ring such as 14 can be used at both ends.

Many fish are lost, especially the larger ones, while the fishermen are attempting to attach them to fish stringers. This cannot happen with a fish stringer constructed in accordance with my invention. With a stringer of my design the safety snap fasteners can be attached to the fish any distance from the stringer, the fish carried to the stringer by means of the snap fastener and then snapped onto the cord. During the entire operation, even before the hook is removed from the fish, since the lower pointed snap hook fastener can be attached to the fish prior to removing the hook, the fisherman has removed the danger to himself, and the danger of loss of the fish. At all times he has the safety snap hook attached to the fish and in his hand as a firm and secure hold on the fish.

Furthermore, the stringer is never interfered with during the entire fishing period. These factors will be greatly appreciated by fishermen, particularly those fishing from a boat. The fish can be attached to the safety snap hooks and then handed to the party nearest the stringer for attachment to the stringer and insertion in the water without removing the fish and stringer from the water and without flopping of the fish in the boat, etc.

While I have shown and described a preferred form of my invention it will be understood that variations in details of form may be made without departure from the invention as defined in the appended claims.

I claim:

1. A fish stringer comprising an elongated cord, said cord having a stop at one end, a series of fish holding attachments mounted on said cord, each comprising a first snap hook fastener having a bight portion slidably receiving said cord and a second snap hook fastener connected to the first snap hook fastener and held in slidable association with said cord by said first snap hook fastener, said second snap hook fastener being removable from association with said cord upon opening of said first snap hook fastener, and spacer means slidably mounted on said cord intermediate the said attachments for spacing said attachments along the cord, each spacer means comprising a member having a peripheral dimension laterally of said cord when mounted thereon which is greater than the lateral inner peripheral dimension of the bight portion of the first snap hook fastener of said attachments.

2. The combination set forth in claim 1 including said first snap hook fasteners being removable from said cord by sliding off one end thereof, but being prevented from sliding off the other end of said cord by said stop.

3. The combination set forth in claim 1 including said second snap hook fastener being movably connected to said first hook fastener.

References Cited in the file of this patent

UNITED STATES PATENTS

| | | |
|---|---|---|
| 175,821 | Clawson | Apr. 11, 1876 |
| 218,902 | Smith | Aug. 26, 1879 |
| 344,488 | McKenzie | June 29, 1886 |
| 597,016 | Parker | Jan. 11, 1898 |
| 709,879 | Deardorff | Sept. 30, 1902 |
| 759,921 | Russell | May 17, 1904 |
| 1,182,471 | Frost | May 9, 1916 |
| 1,237,817 | Ringle | Aug. 21, 1917 |
| 1,440,628 | Raub | Jan. 2, 1923 |
| 1,500,613 | Halloway | July 8, 1924 |
| 2,219,983 | Evenson | Oct. 29, 1940 |
| 2,264,883 | Lent | Dec. 2, 1941 |
| 2,588,768 | Rosenberg | Mar. 11, 1952 |
| 2,595,700 | Plough | May 6, 1952 |
| 2,604,243 | John | July 22, 1952 |
| 2,612,303 | Butler | Sept. 30, 1952 |
| 2,662,257 | Milan et al. | Dec. 15, 1953 |
| 2,676,380 | Lindquist | Apr. 27, 1954 |
| 2,708,538 | Matras | May 17, 1955 |